United States Patent [19]

Leaman et al.

[11] Patent Number: 5,430,825
[45] Date of Patent: Jul. 4, 1995

[54] FIBER OPTIC LIGHT ASSEMBLY METHOD

[76] Inventors: William M. Leaman, 130 Long Island Dr., Moneta, Va. 24121; Jon J. West, 2782 Reesedale Rd., Elliston, Va. 24087

[21] Appl. No.: 266,565

[22] Filed: Jun. 28, 1994

[51] Int. Cl.$^6$ ................................................ G02B 6/36
[52] U.S. Cl. ....................................... 385/147; 385/80; 385/83; 359/900
[58] Field of Search ............... 29/868, 869, 872; 156/158, 166, 293, 296; 385/63, 65, 80, 83, 85, 115, 116, 120, 121, 147, 901; 359/900; 362/32

[56] References Cited

U.S. PATENT DOCUMENTS

| | | | |
|---|---|---|---|
| 3,941,485 | 3/1976 | Madden | 385/901 |
| 4,807,092 | 2/1989 | Hasegawa | 362/32 |
| 4,961,617 | 10/1990 | Shahidi et al. | 385/114 |
| 5,001,306 | 3/1991 | Purcell | 362/33 |
| 5,009,475 | 4/1991 | Knudson | 385/116 |
| 5,013,109 | 5/1991 | Zelan et al. | 362/32 |
| 5,021,928 | 6/1991 | Daniel | 362/32 |
| 5,050,047 | 9/1991 | Viner et al. | 362/32 |
| 5,153,386 | 10/1992 | Siefer et al. | 362/33 |
| 5,160,565 | 11/1992 | Chazalon et al. | 385/120 |
| 5,231,689 | 7/1993 | Reidinger | 385/147 |
| 5,247,600 | 9/1993 | Williams et al. | 385/115 |
| 5,271,585 | 12/1993 | Zetena, Jr. | 248/49 |

FOREIGN PATENT DOCUMENTS

| | | | |
|---|---|---|---|
| 63-186209 | 8/1988 | Japan | 385/115 |
| 2-275401 | 11/1990 | Japan | 385/121 |

Primary Examiner—Rodney B. Bovernick
Assistant Examiner—John Ngo
Attorney, Agent, or Firm—Whitham, Curtis, Whitham & McGinn

[57] ABSTRACT

Fiber optic light displays are fabricated quickly and inexpensively according to a novel, low cost construction technique. Specifically, a plurality of fiber optic strands are drawn between a pair of spaced apart insert sections which have semicircular gaps designed to fit each of the fiber optic strands in a circular opening when the inserts are brought together. A bonding material is positioned between the insert sections and serves as a potting material for the fiber optic strands at the circular openings. After the fiber optic strands are installed and the inserts are bonded together, the ends of the fibers are cut flush with the insert display surface. The insert is then installed in a display, preferably by sliding the insert into a channeled receptacle. The fiber optic strands are collected together and directed out of the receptacle to a light source. The display produced as the advantage of no heat production because the light source is remote from the display surface, and easy production of multiple light beams to enhance the aesthetic or lighting effect of the display without requiring multiple light bulbs or fixtures. Preferably, the fiber optic light displays can be produced in an automated fashion wherein the fiber strands are simultaneously drawn between the inserts and the bonding material is applied over the insert surface automatically.

3 Claims, 1 Drawing Sheet

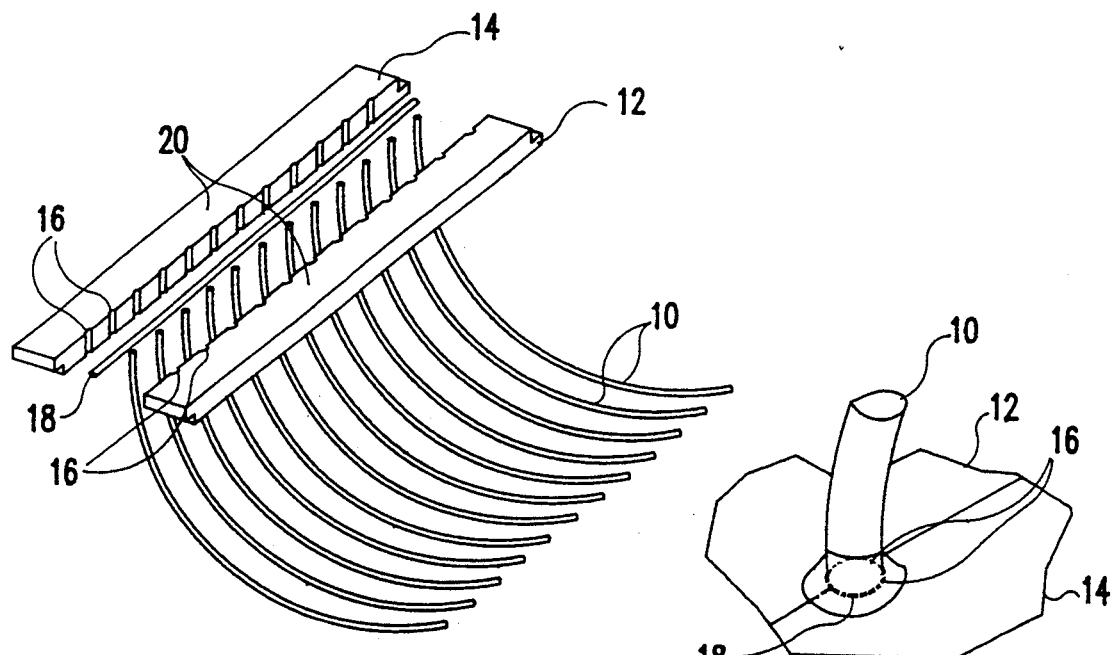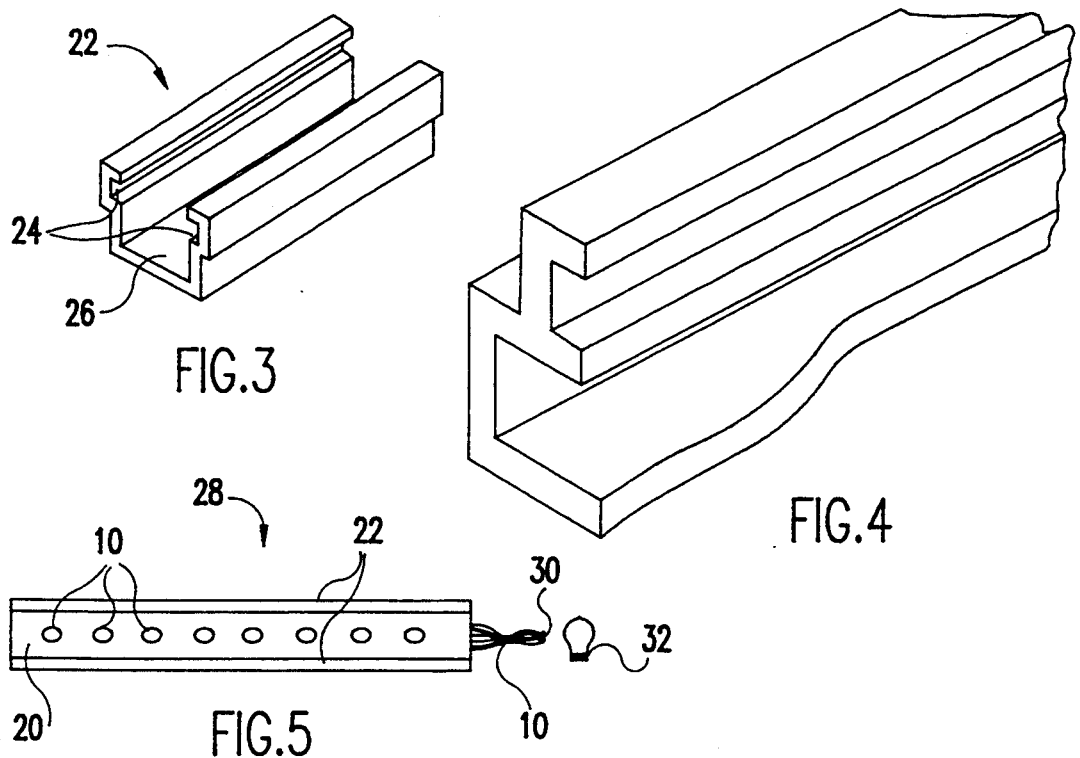

5,430,825

FIBER OPTIC LIGHT ASSEMBLY METHOD

BACKGROUND OF THE INVENTION

1. Field of the Invention

The invention is directed to an improved construction technique for manufacturing fiber optic light assemblies for use as displays and for illumination purposes.

2. Description of the Prior Art

Fiber optics have received considerable attention in recent years and have been widely used in the telecommunications and electronics industries. Fiber optic strands or cables are capable of delivering a light signal between two remote locations with very little attenuation of light energy.

Fiber optic strands and cables have been used to deliver light for the purposes of display and illumination. For example, fiber optic light assemblies are disclosed in the following U.S. Pat. Nos. 5,050,047 to Viner, 5,013,047 to Zelan, 5,160,565 to Chazalon, and 5,231,689 to Reidinger. There are several advantages to using fiber optic strands and cables in lighting assemblies. For example, a single light source can be used to provide multiple, directed points of light, thus reducing the need for multiple light sources. In addition, the light source is remote from the subject matter being illuminated, thereby reducing the effects of heat on the subject matter which often results when the source of light is in close proximity. Also, there is increased safety since the arrangement eliminates the need to run electricity to the illuminated area.

SUMMARY OF THE INVENTION

It is an object of this invention to provide a new construction technique which allows the quick, low cost, automated assembly of fiber optic light assemblies used for display and/or illumination purposes.

According to the invention, a plurality of fiber optic strands are drawn through a pair of spaced apart insert elements, each of which has a semi-circular gap on an inside surface for accomodating a single fiber optic strand. The insert sections are joined together using a bonding material. By joining the inserts together, a plurality of circular openings are created through which the fiber optic strands extend. During joining of the inserts with the bonding material, the fiber optic strands become potted within the circular openings. The ends of the fiber optic strands are cut flush with the display surface of the insert. The insert is then positioned in a display assembly to serve as a light display or illumination source with multiple points of light along the length of the insert. The fiber optic strands are collected and directed towards a light source. Preferably, the insert is slidable within a channel of a display case wherein the fibers are collected in a compartment below the channel and directed to a light source.

DESCRIPTION OF THE DRAWINGS

The foregoing and other objects, aspects and advantages will be better understood from the following detailed description of the preferred embodiments of the invention with reference to the drawings, in which:

FIG. 1 is an isometric view of fibers being positioned between a pair of spaced apart inserts;

FIG. 2 is an isometric view of an individual fiber strand potted in a circular opening in the insert after the insert halves are joined together;

FIG. 3 is an isometric view of an extruded channel into which the insert is fitted;

FIG. 4 is a cut-away isometric view of half an extruded channel showing an alternative step channel design to that shown in FIG. 3; and FIG. 5 is a top view of a display or illumination assembly formed according to the present invention.

DETAILED DESCRIPTION OF THE PREFERRED EMBODIMENTS OF THE INVENTION

FIG. 1 shows a plurality of fiber optic strands 10 being drawn simultaneously between a pair of spaced apart inserts 12 and 14. Suitable fiber optic strands are available from PolyOptical Products, Inc., as well as many other sources. The inside surface of the inserts 12 and 14 each have a plurality of semicircular slots 16 sized for accomodating an individual fiber; hence, the diameter of the slots 16 depends on the diameter of the fiber optic strands 10 and may be just slightly smaller. For example, if the fiber optic strands have a diameter of 0.030 inches, the diameter of the semicircular slots may be 0.028–0.030 inches. The spacing of the slots 16 and the shape of the inserts 12 and 14 are highly variable and depend on the application in which the fiber optic lighting assembly will be used. For example, FIG. 1 shows the inserts 12 and 14 are rectangular and have approximately the same size and shape with the slots 16 being formed in a flat surface of the inserts 12 and 14; however, the inserts could take on any desired shape (e.g., round, triangular, non-geometrical, etc.) and the slots 16 could be formed on a non-planar surface. All that is required is that the inserts 12 and 14 have surfaces a plurality of semi-circular slots 16 that can be joined together. The inserts 12 and 14 can be made from aluminum or other metals with the slots 16 being cut from the surface; however, it is preferable that the inserts be formed from a molded plastic such as polyvinylchloride, polypropylene, ABS, polystyrene, etc.

A bonding material 18, such as epoxy resin, hot melt adhesive, or cyanoacrylate, is applied between the joining surfaces of inserts 12 and 14 to join the inserts together and to bond the fiber optic strands 10 inside circular holes created from aligned slots 16 in the inserts 12 and 14. To enhance automation, the bonding material 18 can be applied as a line as shown in FIG. 1; however, it is also possible to selectively apply the bonding material at selected spots on the inserts.

FIG. 2 shows that when inserts 12 and 14 are joined together using the bonding material 18, each fiber 10 is positioned in a circular opening through the insert which is created from the aligned semi-circular slots in the joining surfaces of the inserts 12 and 14. The bonding material 18, serves as a potting compound in the circular opening to secure the fiber 10 within the circular opening.

With reference to FIG. 2 and reference back to FIG. 1, after the fibers 10 are joined to the inserts 12 and 14 with bonding material 18, the ends of each of the fibers 10 are cut flush with display surface 20. The display surface 20 is simply the surface which will provide the visual display to a viewer or the surface from which the light for illumination purposes will emanate. Cutting can be accomplished simply by running a heated razor edge across the display surface 20, or by other suitable means. The cutting operation can be performed before or after the fiber optic lighting assembly is fabricated from the inserts 12 and 14, fiber optic strands 10, and the display case discussed in conjunction with FIGS. 3 through 5.

FIG. 3 shows a display case 22 which provides a housing for the insert and fiber optic strands. The display case 22 can have many different configurations and depends on the shape of the inserts 12 and 14 used. The function of the display case 22 is to receive the insert and to collect the fiber optic strands together and direct them to a light source. FIG. 3 shows an arrangement where the insert slides within channel 24 and where the fiber optic strands are collected in lower compartment 26. In FIG. 3, the channel 24 which receives the insert is smaller than the lower channel compartment 26.

FIG. 4 shows a configuration where the chanel 24' is smaller than the channel compartment 26'. The important feature for quick assembly which is present in both the configuration shown in FIG. 3 and the configuration shown in FIG. 4 is that the insert can slide into a channel receptacle, and the fiber optic strands will be collected and directed in a lower channel raceway compartment and directed to a source of light. The two channels should be separated by a step, shown as 28 in FIG. 3 and 28' in FIG. 4, to separate the channels.

FIG. 5 shows a fiber optic lighting assembly 28 created according to the present invention. The inserts are positioned in display case 22, and along the display surface 20 of the insert are a plurality of pin point light beams emanating from individual fiber optic strands 10. The fiber optic strands 10 are collected together and have a receiving end 30 positioned to receive light from source 32. The spectrum and intensity of the light emanating from the display surface 20 can be changed simply by positioning a filter between the receving end 30 of the fiber optic strands 10 and the light source 32 or by changing the light source. The fiber optic lighting assembly 28 has the advantage of providing multiple light beams along its display surface using only a single light source 32, as well as the advantage of protecting the lighted area from heat and ultraviolet energy produced from light source 32. The location of the pin point light beams can be varied considerably and depends on the construction of the insert halves 12 and 14. The fiber optic lighting assembly 28 can be used for "display" purposes, for example, by providing a visual signal to a viewer defined by the positioning of the fiber optic ends through the insert. The fiber optic lighting assembly 28 can be used for illumination purposes, such as, for example, to provide light from the underside of a rail of a card or other game table used in a casino operation.

The use of pre-molded inserts with semi-circular slots cut in surfaces of the inserts, as well as the joining and cutting operations described in conjunction with FIGS. 1 and 2, greatly enhance the speed of assembly of a fiber optic lighting assembly 28 according to the present invention. The construction technique avoids the need to individually align fibers with holes in a display surface, as well as the need to position the fibers individually. Positioning of the fiber optic strands is simply controlled by orienting them between the inserts in a pair of aligned slots, followed by bonding the inserts together with the fiber optic strands in the slots, and by cutting the fiber optic ends flush with the display surface. The construction technique is easily automated. For example, a pair of rollers can be positioned on either side of spaced apart insert halves, with the pair of rollers being used to simultaneously advance the plurality of fibers between the spaced apart inserts. The bonding material can be applied across the surface of the inserts in a one step operation of extruding a line of the bonding material over the joining surfaces and the semi-circular slots in the inserts. Cutting the fiber ends can also be accomplished in a one-step operation of running a heated razor edge across the display surface of the inserts after the fibers have been secured in the cylindrical holes.

While the invention has been described in terms of its preferred embodiments, those skilled in the art will recognize that the invention can be practiced with modification within the spirit and scope of the appended claims.

We claim:

1. A method for forming a light delivery assembly, comprising the steps of:

directing a plurality of spaced apart fiber optic strands between a pair of spaced apart inserts, each of said inserts having a surface with a plurality of semi-circular slots, said pair of spaced apart inserts being oriented with said surfaces with said plurality of semi-circular slots facing each other;

positioning a bonding material between said spaced apart inserts for joining said inserts together and bonding said plurality of fiber optic strands to said inserts;

bringing said pair of spaced apart inserts together with said semicircular slots in alignment to form circular passages, said plurality of fiber optic strands having individual fiber optic strands passing through said circular passages;

allowing said bonding material to join said inserts together and bond said plurality of fiber optic strands to said inserts;

cutting an end of each of said fiber optic strands flush with a display surface of said inserts;

positioning said inserts in a display case with said display surface oriented outward from said display case, said display case having a first compartment for receiving said inserts and a second compartment for receiving said plurality of fiber optic strands; and drawing said fiber optic strands through said second compartment to an illumation source.

2. The method of claim 1 wherein said step of directing includes the steps of:

arranging said spaced apart fiber optic strands in parallel; and pulling said spaced apart fiber optic strands between said spaced apart inserts simultaneously.

3. The method of claim 1 wherein said first compartment of said display case is a first channel sized to fit said inserts and wherein said second compartment is a second channel positioned under said first channel with a step separating said first and second channels, and wherein the step of positioning includes the steps of:

sliding said inserts into said first channel; and collecting said fiber optic strands together in said second channel.

* * * * *